United States Patent [19]
Yosida et al.

[11] Patent Number: 5,277,483
[45] Date of Patent: Jan. 11, 1994

[54] BRAKING APPARATUS FOR USE IN A MOTOR VEHICLE

[75] Inventors: Akihide Yosida, Ichinomiya; Kenichi Numata, Chiryu; Naohiko Tsuru, Handa, all of Japan; Hideaki Suzuki, Schwabisch-hall, Fed. Rep. of Germany

[73] Assignee: Nippondenso Co., Ltd., Kariya, Japan

[21] Appl. No.: 868,800

[22] Filed: Apr. 15, 1992

[30] Foreign Application Priority Data

Apr. 18, 1991 [JP] Japan ................................. 3-087004
Dec. 9, 1991 [JP] Japan ................................. 3-324735

[51] Int. Cl.⁵ ............................................. B60T 8/48
[52] U.S. Cl. ............................ 303/113.2; 303/116.2; 303/DIG. 3
[58] Field of Search ............... 303/113.2, 116.1, 116.2, 303/110, DIG. 3, DIG. 4; 180/197

[56] References Cited

U.S. PATENT DOCUMENTS

| | | | |
|---|---|---|---|
| 4,796,959 | 1/1989 | Seibert et al. | 303/113.2 |
| 4,865,397 | 9/1989 | Inoue et al. | 303/113.2 |
| 4,872,730 | 10/1989 | Takagi et al. | 303/110 |
| 4,900,102 | 2/1990 | Jonner et al. | 303/110 |
| 4,938,541 | 7/1990 | Shaw et al. | 303/116.2 |
| 5,125,724 | 6/1992 | Steiner | 303/113.2 |
| 5,131,730 | 7/1992 | Kollers et al. | 303/113.2 |
| 5,141,296 | 8/1992 | Arikawa | 303/113.2 |

FOREIGN PATENT DOCUMENTS

| | | |
|---|---|---|
| 63-279956 | 11/1988 | Japan . |
| 1-111558 | 4/1989 | Japan . |
| 1-254460 | 10/1989 | Japan . |
| 2-18150 | 1/1990 | Japan . |
| 2-200552 | 8/1990 | Japan .............. 303/113.2 |
| 2-231256 | 9/1990 | Japan . |

*Primary Examiner*—Matthew C. Graham
*Attorney, Agent, or Firm*—Cushman, Darby & Cushman

[57] ABSTRACT

A braking apparatus for a motor vehicle equipped with a master cylinder and a wheel cylinder. The apparatus further includes a pump coupled to a reservoir tank to suck a braking liquid from the reservoir tank and pressurize and discharge the sucked braking liquid when a slip of the wheel occurs at the time of driving the wheel, a pressure adjusting valve provided in a pipe coupling a discharge side of the pump to the reservoir tank and arranged to be openable to restrict the discharge pressure of the pump to a predetermined value, and a change-over valve for establishing a communication between the discharge side of the pump and the wheel cylinder when a slip of the wheel occurs at the time of driving the wheel and for establishing a communication between the master cylinder and the wheel cylinder when the slip does not occur. The apparatus controls a braking pressure adjusting device provided between the change-over valve and the wheel cylinder for adjusting the braking pressure to be applied to the wheel cylinder when a drive slip of the wheel occurs, thereby suppressing the drive slip. This arrangement allows the size-reduction of the apparatus and the suppression of generation of operating sound.

13 Claims, 12 Drawing Sheets

BRAKING APPARATUS FOR USE IN A MOTOR VEHICLE

BACKGROUND OF THE INVENTION

The present invention relates generally to braking apparatus for use in motor vehicles, and more particularly to such a braking apparatus for controlling the slippage of a wheel of the motor vehicle.

Such a braking apparatus is known as exemplified by description in the Japanese Patent Provisional Publication No. 1-254460 where there is provided a braking hydraulic pressure supply source for applying a braking force to a wheel of a motor vehicle when slip occurs at the time of driving of the wheel. This braking hydraulic pressure supply source comprises a pump coupled to a reservoir tank, an accumulator connected to the discharge side of the pump for accumulating a high-pressure braking liquid, and a pressure switch for detecting the pressure within the accumulator. The pump is driven in response to a detection signal of the pressure switch so as to keep the pressure within the accumulator in a predetermined range. However, one of important problem is that such a braking hydraulic pressure supply source complicates the structure of the braking apparatus and increases the weight of the braking apparatus, and another problem is that there is the possibility that the accumulator deteriorates the braking performance because gas is mixed in the braking hydraulic pressure passage. In addition, when the drive slip occurs, the braking liquid having a pressure higher than the pressure within the accumulator is supplied into a wheel cylinder of the wheel, thereby generating a large working sound because the pressure-increasing speed is too high.

The Japanese Patent provisional Publication No. 2-18150 discloses a technique to reduce the size and weight of the braking apparatus by using a self-priming pump for preventing the drive slip of the wheel. However, this self-priming pump is very restricted in its installing position because the suction resistance of the self-priming pump increases in the case that the distance between the self-priming pump and the reservoir tank is long. Moreover, if some trouble occurs in the self-priming pump, difficulty is encountered to perform both the wheel braking operation and drive slip preventing operation.

SUMMARY OF THE INVENTION

It is therefore an object of the present invention to provide a braking apparatus for a motor vehicle which is capable of preventing an excessive slippage of a wheel of the motor vehicle at the time of braking or driving the wheel concurrently with reducing and simplifying its weight and structure, and further preventing a deterioration of the braking performance and ensuring the slip preventing function irrespective of occurrence of a trouble.

According to this invention, a braking apparatus comprises a first reservoir for storing a braking liquid, a first pump coupled to a first reservoir and driven so as to suck the braking liquid from the first reservoir to pressurize and discharge the sucked braking liquid when the drive slip of a wheel occurs, a pressure adjusting valve provided in a pipe coupling a discharge side of the first pump to the first reservoir and arranged to be openable when a discharge pressure of the first pump exceeds a predetermined value so that the braking liquid is returned to the first reservoir to restrict the discharge pressure of the first pump to the predetermined value, and valve means for establishing a communication between the discharge side of the first pump and the wheel cylinder when the drive slip of the wheel occurs, and for establishing a communication between the master cylinder and the wheel cylinder when the drive slip does not occur. Braking pressure adjusting means is provided between the valve means and the wheel cylinder to adjust the braking pressure to be applied to the wheel cylinder when the braking or drive slip of the wheel occurs so as to suppress the drive slip.

The braking pressure adjusting means comprises a second reservoir for storing the braking liquid discharged from the wheel cylinder, a control switching valve arranged to selectively take at least a pressure-increasing position for establishing a communication between the valve means and the wheel cylinder and a pressure-decreasing position for establishing a communication between the wheel cylinder and the second reservoir, and a second pump for pressurizing the braking liquid stored in the second reservoir to return the braking liquid to between the valve means and the control switching valve. The first reservoir stores the braking liquid under an atmosphere pressure and the second reservoir stores the braking pressure under a pressure higher than the atmosphere pressure, and the first and second reservoirs are coupled to each other through a first passage including a change-over valve for establishing and cutting a communication between the first and second reservoirs. The apparatus further comprises an escape valve provided in parallel to the pressure adjusting valve and arranged to restrict the discharge pressure of the first pump to a predetermined value to be restricted by the pressure adjusting valve, the pressure adjusting valve and the escape valve being respectively connected to portions of the first passage between the first and second reservoirs so that the change-over valve is disposed between the connecting portions of the pressure adjusting valve and the escape valve, and the apparatus further comprises a check valve for preventing the braking liquid from directing to the discharge side of the first pump, the check valve being provided in a second passage between the discharge side of the first pump and the valve means and disposed between portions of the second passage which are respectively coupled to the pressure adjusting valve and the escape valve.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
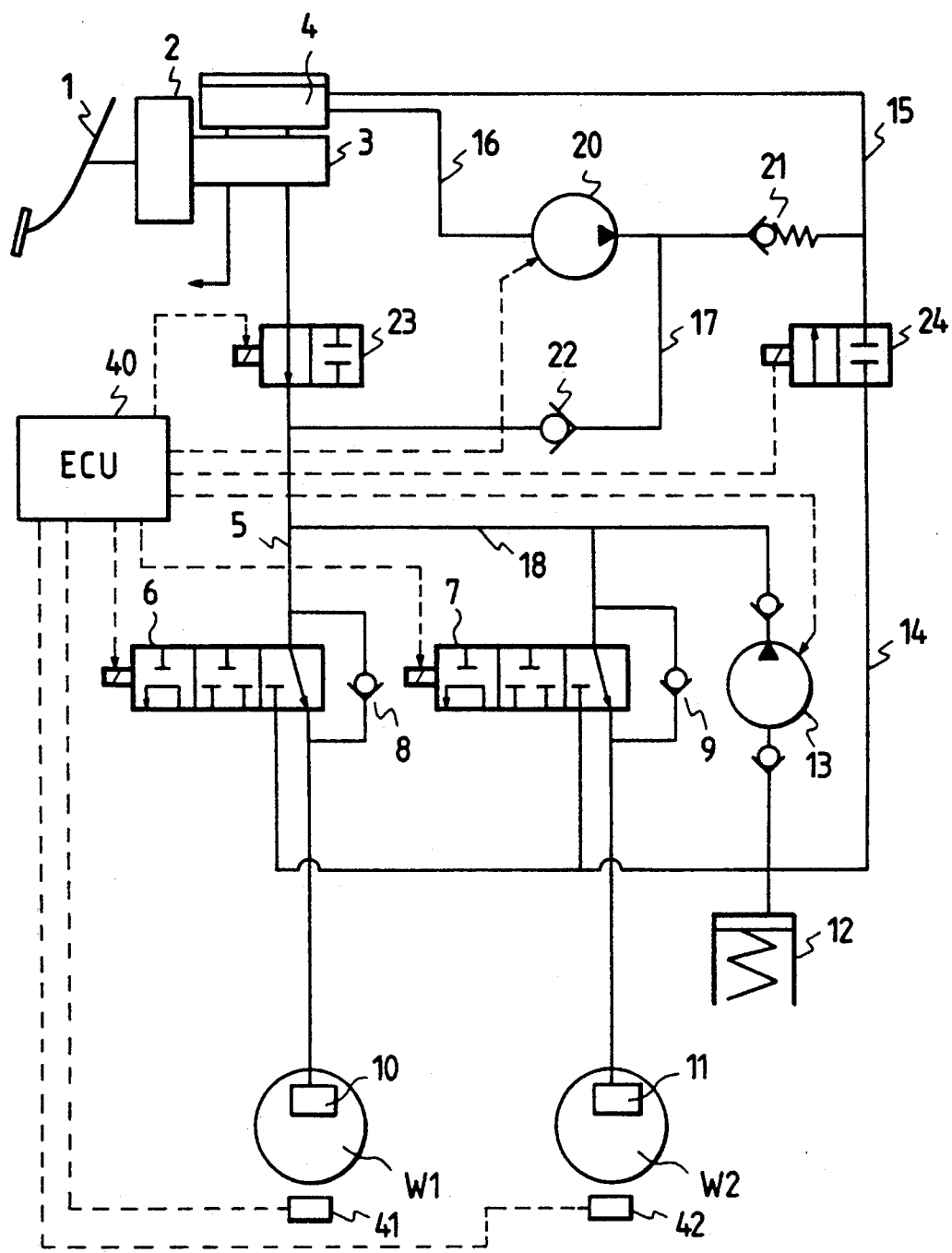
FIG. 1 shows an arrangement of a braking apparatus according to a first embodiment of the present invention.

Referring now to FIG. 1, there is illustrated a braking apparatus according to an embodiment of the present invention which is incorporated into a motor vehicle. This braking apparatus has both a traction control function and an anti-skid control function which is for preventing an excessive slip of a wheel of the motor vehicle at the time of braking and the driving the wheel. In FIG. 1 showing a normal state that the braking apparatus is not in the traction or anti-skid control, designated at numeral 3 is a master cylinder which generates a braking pressure in accordance with a depressing force of a braking pedal 1 and a boosting action of a vacuum booster 2. This master cylinder 3 is communicated with a reservoir tank 4 for storing a braking liquid. Further, illustrated at numerals 10 and 11 are wheel cylinders which are responsive to braking pressures from the master cylinder 3 or the other pressure source so as to give braking forces to driven wheels W1 and W2 of the motor vehicle. Between the master cylinder 3 and the wheel cylinders 10, 11 for the wheels W1, W2 there is provided a hydraulic pressure unit for controlling or adjusting the braking pressures to the wheel cylinders 10 and 11. This hydraulic pressure unit comprises control switching valves 6, 7, check valves 8, 9, a reservoir 12 and a pump 13 to be driven by an electric motor (not shown). Each of the control switching valves 6 and 7 can selectively take a pressure-increasing mode that each of the wheel cylinders 10 and 11 is communicated with the master cylinder 3 and the discharging side of the pump 13, take a pressure-decreasing mode that each of the wheels cylinders 10 and 11 is communicated with the reservoir 12, and further take a pressure-maintaining mode that each of the wheel cylinders 10 and 11 does not establish such communications therewith. Here, the control switching valves 6 and 7 operate on the traction control operation to control the braking pressure to be supplied to the wheel cylinders 10 and 11.

Also included in the braking apparatus is a hydraulic pressure unit for the traction control which comprises a first change-over valve 23, a second change-over valve 24, a pump 20, a check valve 22 and a pressure adjusting valve 21. The first change-over valve 23 is disposed between the master cylinder 3 and the control switching valves 6, 7 for establishing and cutting the communication therebetween. The check valve 22 is provided in a pipe 17 coupling the discharge side of the pump 20 to a pipe 5 between the first change-over valve 23 and the control switching valves 6, 7, and arranged to allow only the flow of the braking liquid from the discharge side of the pump 20 to the control switching valves 6, 7. Further, the suction side of the pump 20 is coupled through a pipe 16 to the reservoir tank 4 so as to pressurize and discharge the braking liquid from the reservoir tank 4 when being driven by an electric motor, not shown. The pressure adjusting valve 21 is provided in a pipe 15 between the discharge side of the pump 20 and the reservoir tank 4 and arranged to take the opening state when the discharge pressure of the pump 20 exceeds a predetermined value, thereby letting a portion of the braking liquid escape to the reservoir tank 4 so that the discharge pressure of the pump 20 is limited to the predetermined value. The second change-over valve 24 is provided in a pipe 14 between the reservoir 12 and the reservoir tank 4 so as to establish and cut the communication therebetween.

Further, designated at numeral 40 is an electronic control unit (ECU) constructed with a well-known microcomputer which is responsive to the detection signals of various sensors such as wheel speed sensors 41 and 42 to output drive signals (control signals) to motors for driving the first and second change-over valves 23, 24, the control switching valves 6, 7 and the pumps 13, 20.

Figure 2:
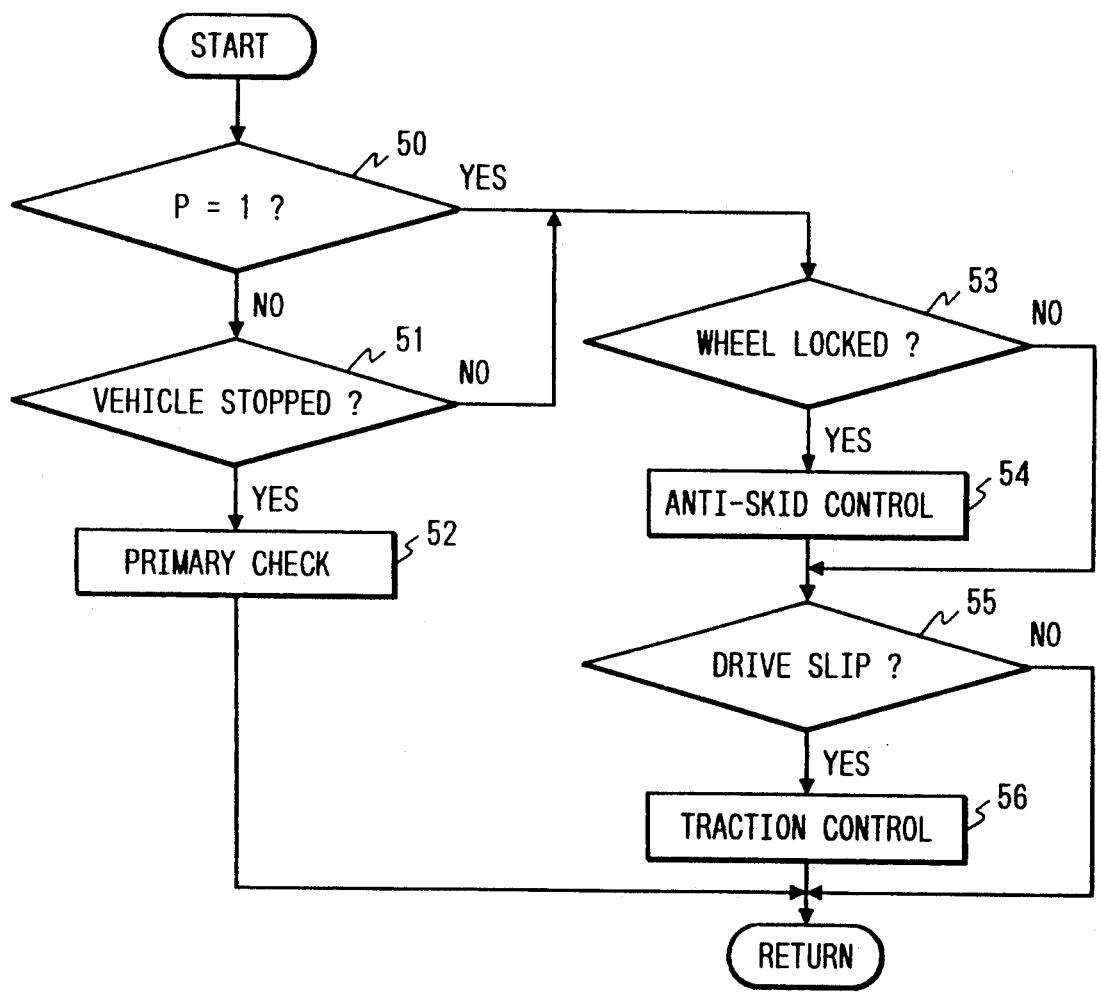
FIG. 2 is a flow chart showing a control operation to be executed in the braking apparatus of this invention.
Figure 3:
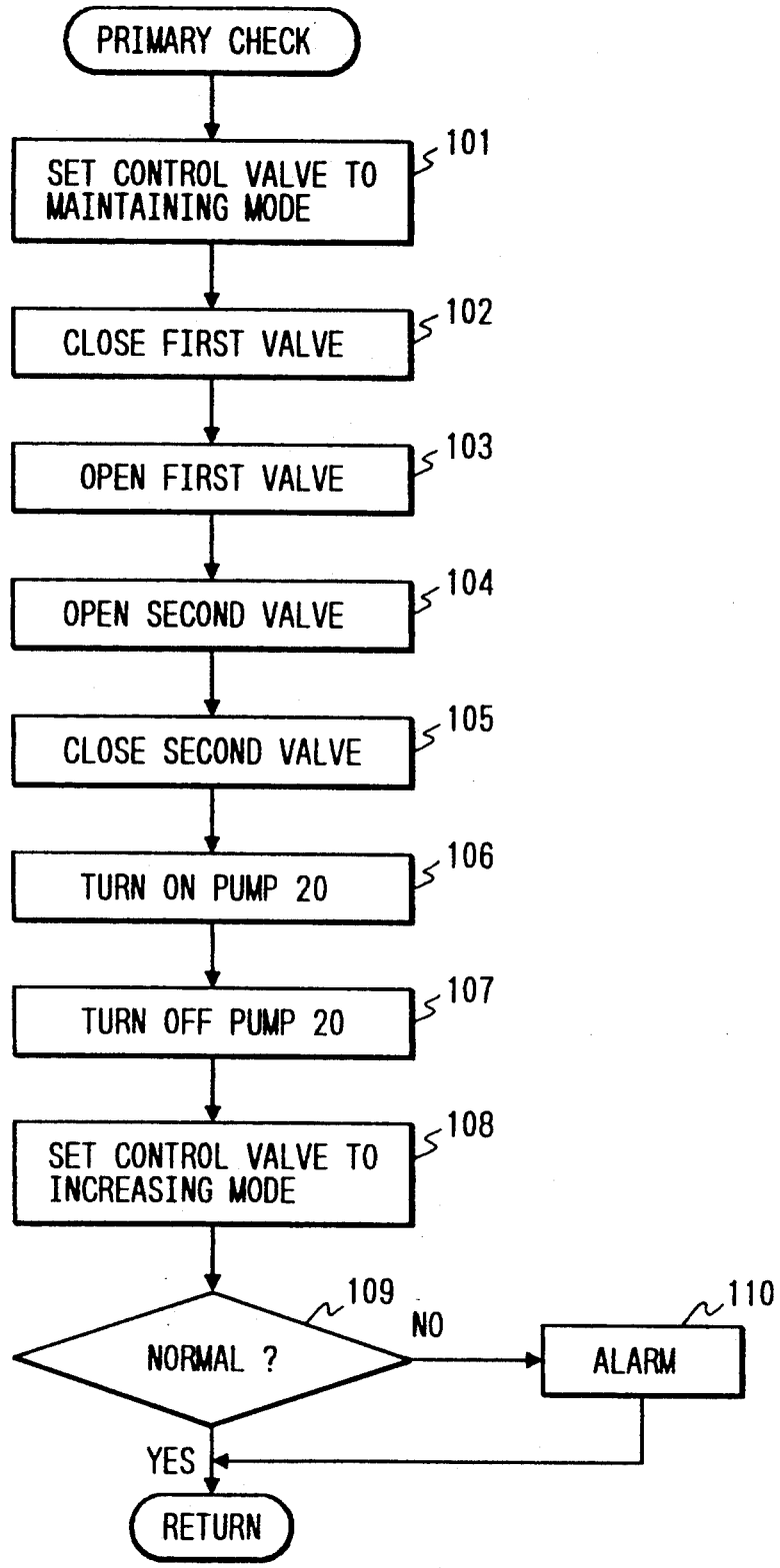
FIG. 3 is a flow chart showing a primary check operation of the braking apparatus of this invention.
Figure 4:
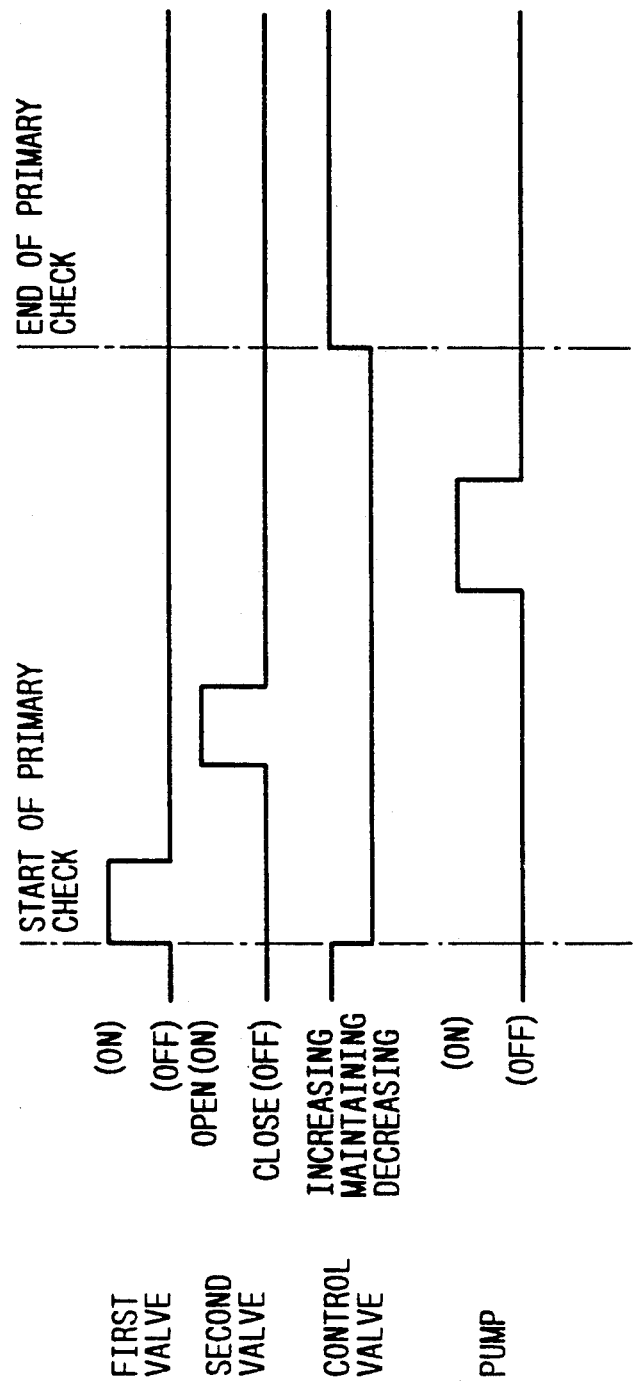
FIG. 4 is a timing chart useful for describing the primary check.

Secondly, the operation of the braking apparatus thus arranged will be described hereinbelow with reference to FIGS. 2 to 4. FIGS. 2 and 3 show the processing procedure to be executed by the ECU 40 in response to the turning-on of an ignition switch of the motor vehicle, and FIG. 4 is a timing chart for describing a primary check operation. In FIG. 2, the operation starts with a decision step 50 to determine the completion of the primary check in accordance with a primary flag P. The microcomputer initially sets the primary flag P to "0", and hence the decision of the step 50 becomes negative immediately after the turning-on of the ignition switch so as to advance the control to a step 51. The step 51 is for checking whether the motor vehicle is in the stopping state. If the answer of the step 51 is affirmative, the control goes to a step 52 in order to perform the primary check. After the completion of the primary check in the step 52, the decision of the step 50 becomes "YES". On the other hand, if the decision of the step 50 is "YES" or if the answer of the step 51 is negative, a step 53 follows to check whether a wheel of the motor vehicle has a locking tendency due to generation of an excessive slip of the wheel at the time of a braking operation. If having the locking tendency, the control proceeds to a step 54 to perform the anti-skid control. If not having the locking tendency or if the process in the step 54 is completed, the control advances to a step 55 to check whether the wheel excessively slips at the time of being driven (accelerated). If so, a step 56 follows to perform the traction control. If not, the operational flow returns.

A description will be made hereinbelow with reference to FIGS. 3 and 4 in terms of the above-mentioned primary check to be executed in the step 52 in FIG. 2. The primary check is effected, before actually performing the braking pressure control, in order to check whether portions of the apparatus can normally operate. In addition, the periodical execution of the primary check can prevent the portions of the apparatus from being corroded or prevent the operating portions of the apparatus from being fixed. The primary check routine illustrated in FIG. 3 is effected each time the ignition switch is turned on or when the ignition switch is turned on several times. During the execution of the primary check a lamp (not shown) lights so as to give information indicative of the execution of the primary check to the vehicle driver.

In FIG. 3, the primary check routine starts with a step 101 to respectively switch the control switching valves 6 and 7 (control valves in the illustration) to the pressure-maintaining modes as illustrated in FIG. 4 so that the pressure from the pump 20 is not applied to the wheel cylinders 10 and 11. In subsequent steps 102 and 103, the first change-over valve 23 (first valve in the illustration) which is of the normally opening type is switched to the closing state and then restored again to the opening state. During this switching operation of the first change-over valve 23, the operation thereof is monitored to check whether the first change-over valve 23 can surely operate. Further, in steps 104 and 105, the second change-over valve 24 (second valve in the illustration) which is of the normally closing type is switched to the opening state and then restored to the closing state, thereby similarly checking whether the second change-over valve 24 can surely operate. Furthermore, in steps 106 and 107, the pump 20 is once driven and then stopped immediately. The driving time period of the pump 20 is set to a time that allows the operation of the pump-driving motor (not shown) and makes the increase in the discharge pressure of the pump 20 as small as possible. In the next step 108, the control switching valves 6 and 7 are respectively switched to the pressure-increasing modes, then followed by a step 109 to check whether the first and second change-over valves 23, 24 and the pump 20 are in normal states. If being in the normal states, this routine terminates, and if being in the abnormal states, the ECU 40 turns on an alarm lamp (not shown) and then terminates this routine.

Here, since in the aforementioned primary check routine the increase of the discharge pressure of the pump 20 is slightly small, it is also appropriate to continuously keep the control switching valves 6 and 7 to the pressure-increasing modes.

Figure 5:
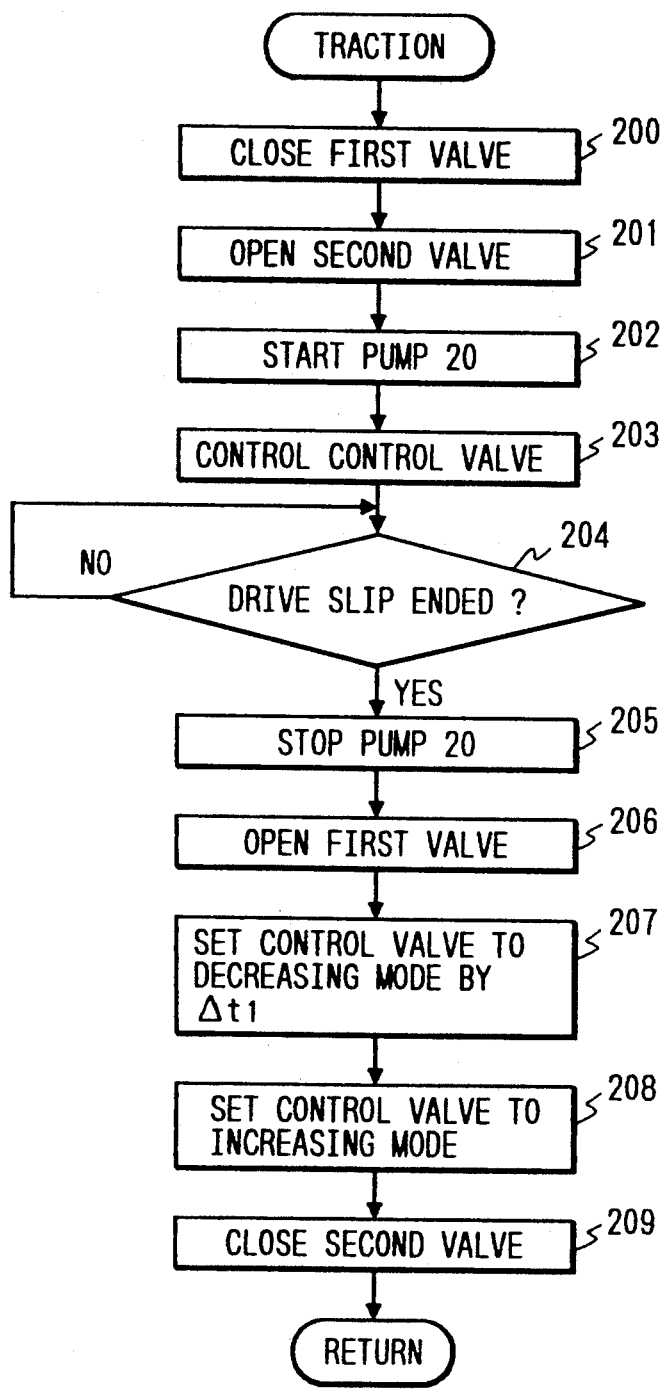
FIG. 5 is a flow chart for describing a traction control operation to be executed in the braking apparatus of this invention.
Figure 6:
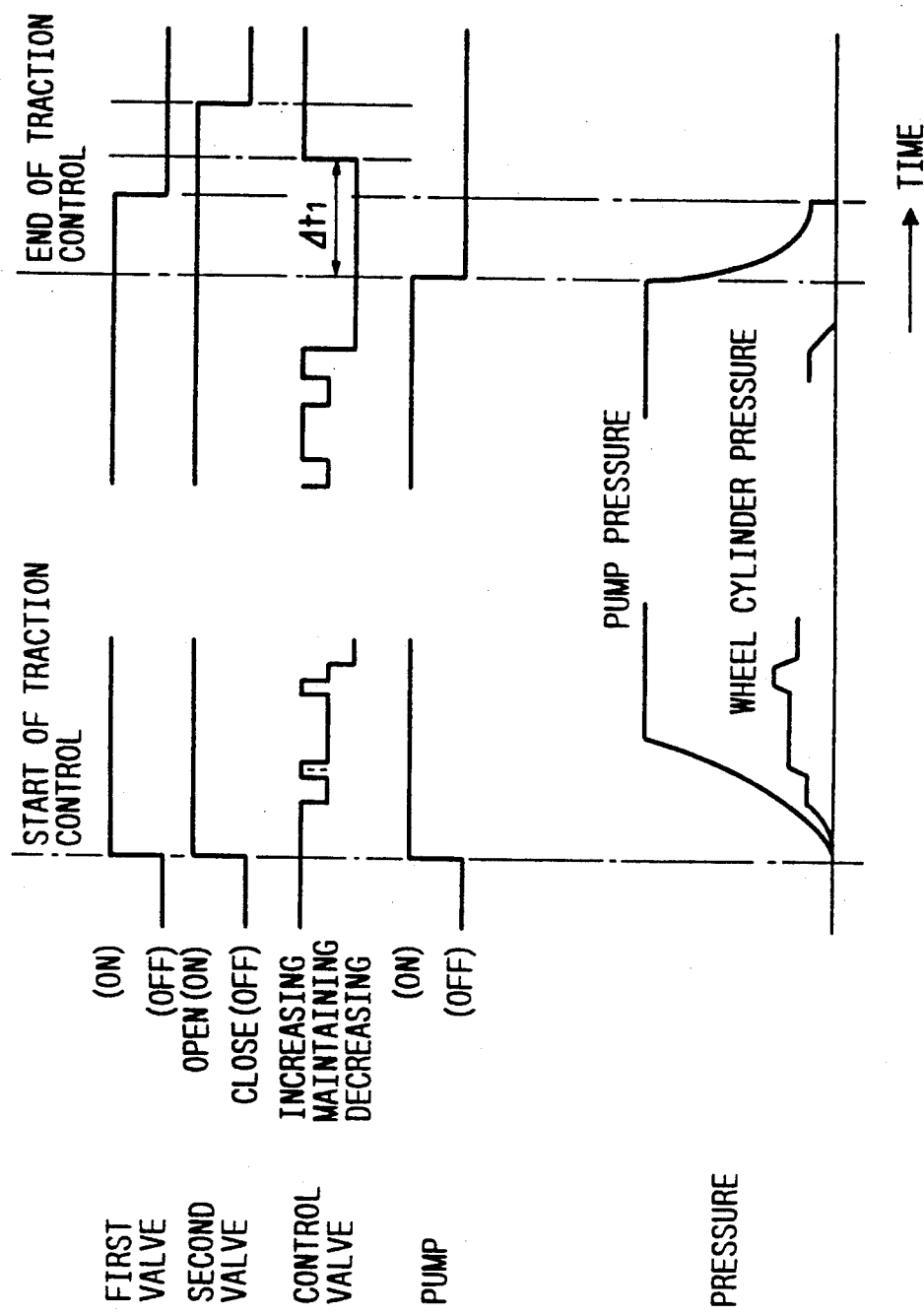
FIG. 6 is a timing chart useful for describing the traction control operation.

Secondly, a description will be made hereinbelow with reference to FIGS. 5 and 6 in terms of the traction control operation. The traction control begins when a decision is made, on the basis of the detections signals of the wheel speed sensors 41, 42 and wheel speed sensors for non-driven wheels (not shown), such that the driven wheels W1 and W2 enter into slipping states. In FIG. 5, the traction control operation starts from a step 200 to close the normally opening type first change-over valve 23, thus cutting the communication between the master cylinder 3 and the wheel cylinders 10, 11. Then, a step 201 follows to open the normally closing type second change-over valve 24 so as to establish the communication between the reservoir tank 4 and the reservoir 12. In a subsequent step 202 the pump 20 is started to discharge the high-pressure braking liquid, then followed by a step 203 to perform the switching operations of the control switching valves 6 and 7 among the pressure-increasing modes, pressure-decreasing modes and pressure-maintaining modes in accordance with the slipping states of the driven wheels W1 and W2.

Here, one example of the switching control of the control switching valves will be described hereinbelow. Since the slipping amounts of the driven wheels W1 and W2 are large at the time of the start of the traction control operation, the control switching valves 6 and 7 are set to the pressure-increasing modes as illustrated in FIG. 6. Accordingly, the high-pressure braking liquid discharged from the pump 20 is supplied through the check valve 22 and the control switching valves 6, 7 to the wheel cylinders 10, 11, whereby braking forces are generated with respect to the driven wheels W1 and W2 to suppress the excessive slips of the driven wheels W1 and W2. Further, when the wheel speeds of the driven wheels W1 and W2 are restored up to adequate values, the control switching valves 6 and 7 are switched to the pressure-maintaining modes so as to prohibit the movements of the braking liquid within the wheel cylinders 10 and 11 to keep the braking pressures. On the other hand, when a decision is made such that excessive braking forces are applied to the driven wheels W1 and W2, the control switching valves 6 and 7 are respectively switched to the pressure-decreasing modes. Accordingly, the braking liquid within the wheel cylinders 10 and 11 are discharged through the control switching valves 6 and 7 to the reservoir 12, thereby decreasing the hydraulic pressures within the wheel cylinders 10 and 11, whereby the braking forces for the driven wheels W1 and W2 are also decreased so as to prevent the wheel speeds of the driven wheels W1 and W2 from excessively lowered. With this operation being repeatedly effected, it is possible to suppress the excessive slips of the driven wheels W1 and W2 to ensure the stability and the acceleration performance of the motor vehicle.

Returning again to FIG. 6, a step 204 is then executed in order to check whether the slipping states of the driven wheels W1 and W2 are sufficiently suppressed so as to be terminated. If the slipping states are not yet terminated, the switching operation in the step 203 is repeatedly performed. If the answer of the step 204 is affirmative, the control advances to a step 205 and the subsequent steps for the traction control terminating operation. That is, the pump 20 is stopped in the step 205 and the output of the drive signal to the first change-over valve 23 is stopped after a predetermined time period is elapsed from the drive stopping of the pump 20. More specifically, as shown in FIG. 6, irrespective of the stop of the drive of the pump 20, the first change-over valve 23 takes the closing state to cut the communication between the master cylinder 3 and the wheel cylinders 10, 11 for the predetermined time period. Further, in a step 207 the control switching valves 6 and 7 are set to the pressure-decreasing modes only for the time Δt1 whereby the braking liquid supplied to the wheel cylinders 10, 11 in the traction control are discharged to the reservoir 12. Here, the second change-over valve 24 is kept to the opening state only for a predetermined time period after the stopping of the pump 20, whereby the braking liquid discharged to the reservoir 12 is returned through the second change-over valve 24 to the reservoir tank 4. This is because, since the reservoir tank 4 stores the braking liquid under a pressure substantially equal to the atmosphere pressure and the reservoir 12 stores the braking liquid under a predetermined pressure, when the reservoir tank 4 is communicated with the reservoir 12, the braking liquid flows from the reservoir 12 to the reservoir tank 4 due to the pressure difference.

In a step 208 the control switching valves 6 and 7 are switched to the pressure-increasing modes and in a step 209 the second change-over valve 24 is switched to the closing state, thereafter terminating this routine.

Further, a description will briefly be made in terms of the anti-skid control. At the time of the braking operations, the ECU 40 calculates the slip ratios and the accelerations or decelerations of the driven wheels W1 and W2 on the basis of the detection signals of the wheel speed sensors 41, 42 and wheel speed sensors for the non-driven wheels (not shown) so as to check, on the basis of the calculation results, whether each wheel is in a locking tendency. Further, in the anti-skid control operation started in accordance with the calculation results, the pump 13 is driven and the control switching valves 6 and 7 are switching-controlled.

Figure 7:
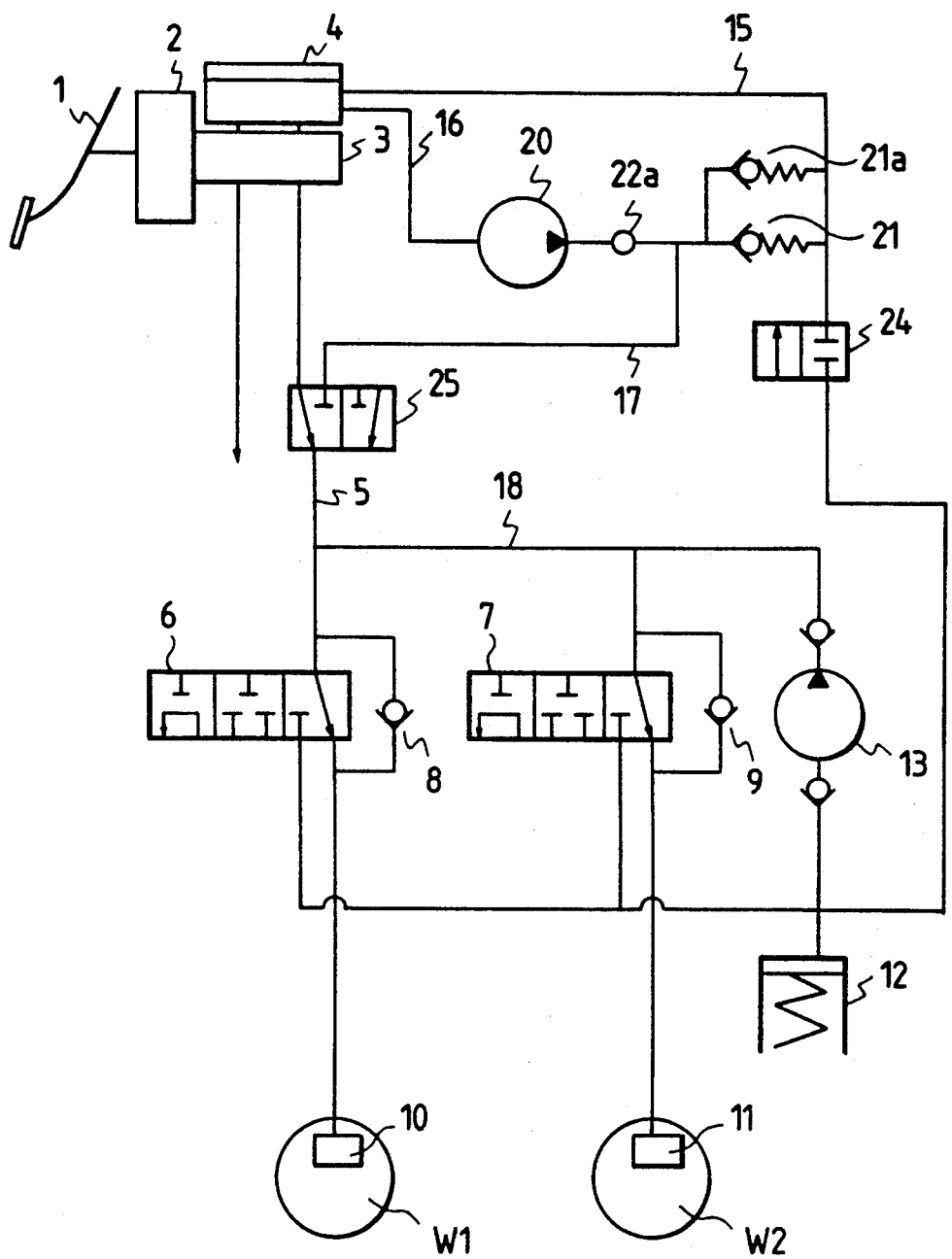
FIG. 7 illustrates an arrangement of a braking apparatus according to a second embodiment of this invention.

In addition, a description will be made hereinbelow with reference to FIG. 7 in terms of a second embodiment of this invention. In FIG. 7, parts corresponding to those in FIG. 1 are marked with the same numerals and the description of the control will be omitted for brevity because of being substantially similar to that of the above-described first embodiment. One difference between the first and second embodiments is that, although in the first embodiment the discharge pressure of the pump 20 is restricted to a redetermined value by means of the pressure adjusting valve 21, in the second embodiment a pressure escape valve 21a is provided in parallel to the pressure adjusting valve 21. The pressure escape valve 21a restricts the discharge pressure of the pump 20 to a value higher than the predetermined pressure to be restricted by the pressure adjusting valve 21. Thus, in the case that the pressure adjusting valve 21 normally operates, the pressure escape valve 21a does not operate, i.e., takes the closing state. On the other hand, for example, in case that the pressure adjusting valve 21 is fixed so as to keep the closing state and the discharge pressure of the pump 20 excessively increases, the braking pressure can be escaped through the pressure escape valve 21a to the reservoir tank 4. Accordingly, it is possible to prevent the excessive increase in the pump discharge pressure and prevent damages of the hydraulic pressure passages.

In addition, although in the first embodiment the 2-port 2-position change-over valve 23 performs the switching operation between establishing and cutting the communication between the master cylinder 3 and the wheel cylinders 10, 11, in the second embodiment a 3-port 2-position change-over valve 25 is provided so as to communicate one of the master cylinder 3 and the pump 20 with the wheel cylinders 10, 11 and cut the communication of the other side therewith. Thus, when the change-over valve 25 is set to establish the communication between the wheel cylinders 10, 11 and the master cylinder 3 and to cut the communication between the wheel cylinders 10, 11 and the pump 20, even if the pump 20 is driven in the primary check or others in no connection with the actual control, the master cylinder 3 and the wheel cylinders 10, 11 are not affected by the drive of the pump 20.

Moreover, in the second embodiment a check valve 22a is provided between the discharge side of the pump 20 and the pressure adjusting valve 21. Thus, for example, when the change-over valve 25 breaks down to couple the master cylinder 3 through the change-over valve 25 to a pipe 17 provided between the discharge side of the pump and the change-over valve 25, the check valve 22a can prevent the flow of the braking liquid toward the pump 20 side. Further, since the braking liquid can be sealed by the pressure adjusting valve 21 until reaching a predetermined pressure, it is possible to ensure the braking force due to the predetermined pressure.

Figure 8:
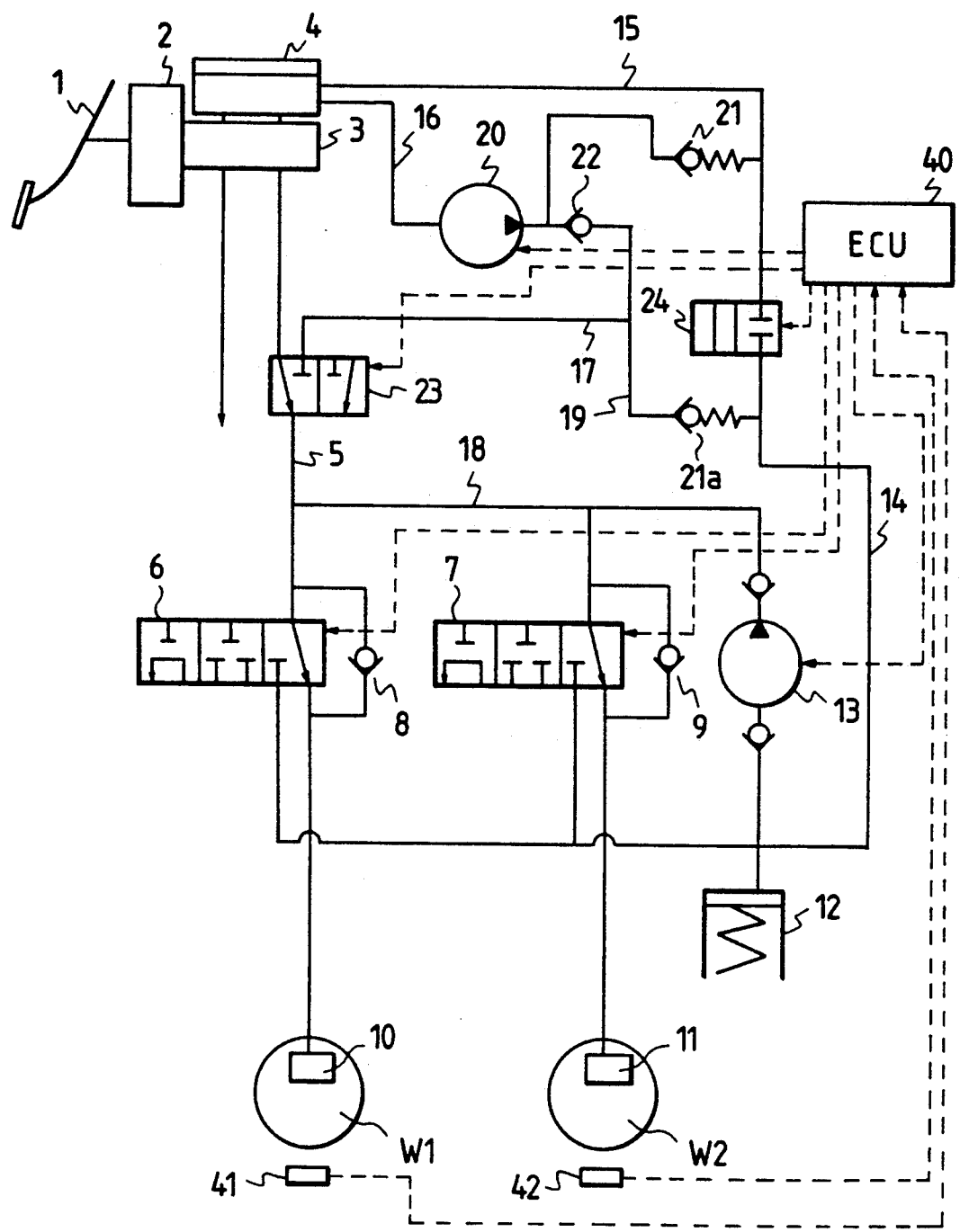
FIG. 8 shows an arrangement of a braking apparatus according to a third embodiment of this invention.

Moreover, a description will be made hereinbelow with reference to FIG. 8 in terms of a braking apparatus according to a third embodiment of this invention. In FIG. 8, parts corresponding to those in FIG. 7 are marked with the same numerals and characters, and the description of the corresponding parts (arrangements) will be omitted for brevity. In the third embodiment, a check valve 22 is provided in a pipe 17 coupling the discharge side of the pump 20 to the first change-over valve 23. This check valve 22 normally allows the braking liquid to direct to the first change-over valve 23 and a pressure escape valve 21a. The discharge side of the pump 20 is also coupled to a pressure adjusting valve 21 which is in turn coupled to a pipe 15 between the reservoir tank 4 and the second change-over valve 24. The pressure adjusting valve 21 is for restricting the discharge pressure of the pump 20 to a predetermined value. The aforementioned pressure escape value 21a is provided in a pipe 19 coupling the pipe 17 disposed between the check valve 22 and the first change-over valve 23 to a pipe 14 disposed between the second change-over valve 24 and a reservoir 12. This pressure escape valve 21a is for restricting the discharge pressure of the pump 20 to a predetermined value higher than the predetermined value restricted by the pressure adjusting valve 21.

The control operation of the third embodiment is substantially equal to that of the above-described first embodiment, and hence the description thereof will be omitted for the simplification.

According to the third embodiment, if the master cylinder 3 is coupled through the first change-over valve 23 to the pipe 17 because of a trouble of the first change-over valve 23, the flow of the braking liquid from the pipe 17 to the discharge side of the pump 20 is blocked by the check valve 22. Thus, even in case that the pressure-maintaining performance of the pressure adjusting valve 21 is lowered due to abrasion caused by the cavitation erosion or the like, it is possible to prevent the braking liquid from being led into the reservoir tank 4. Further, the flow of the braking liquid to the pipe 14 is blocked by the pressure escape valve 21a until its pressure reaches the predetermined value. Since the pressure escape valve 21a does not operate when the pressure adjusting valve 21 normally operates, the pressure-maintaining performance of the pressure escape valve 21a can adequately be kept without being lowered due to the abrasion caused by the cavitation erosion or the like. Even if the pressure-maintaining performance of the pressure escape valve 21a is lowered, although being introduced through the pressure escape valve 21a into the pipe 14, the braking liquid is stored in the reservoir 12 but not led into the reservoir tank 4 because the second change-over valve 24 is in the closing state. Since the amount of the braking liquid to be stored in the reservoir 12 is normally smaller considerably than the amount of the braking liquid to be stored in the reservoir tank 4, the reservoir 12 is immediately filled with the braking liquid and the braking liquid is supplied through the pipe 5 to the wheel cylinders 10, 11 without passing through the pipe 17. Thus, even if the master cylinder 3 communicates with the pipe 17 and the pressure-maintaining performance of the pressure escape valve 21a is lowered, the braking liquid is supplied to the wheel cylinders 10, 11, thereby ensuring a braking force. These effects of the third embodiment can be obtained in both normal braking operation and ABS control operation. Accordingly, even if the first change-over valve 23 breaks down, it is possible to ensure the normal braking function and the ABS function.

Figure 9:
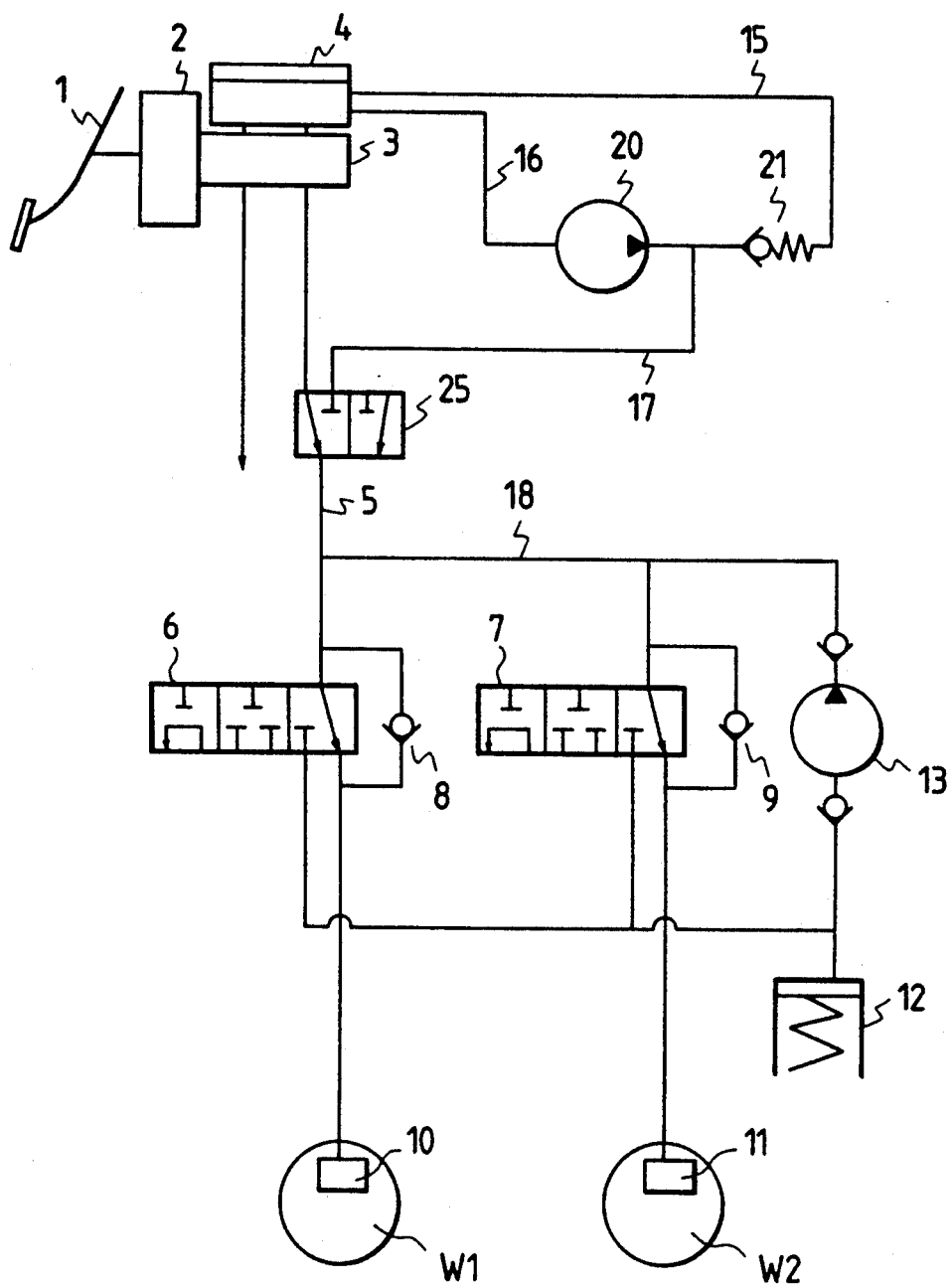
FIG. 9 shows an arrangement of a braking apparatus according to a fourth embodiment of this invention.
Figure 10:
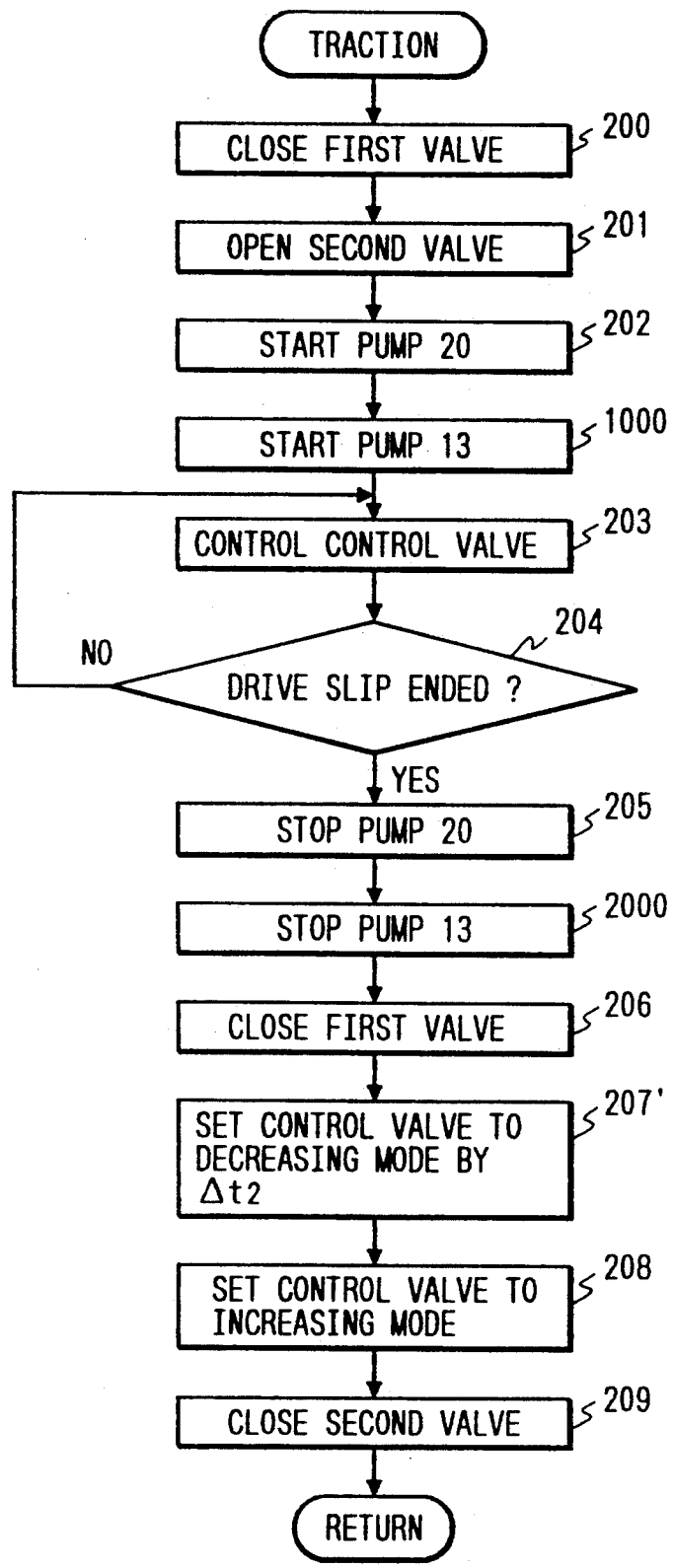
FIG. 10 is a flow chart showing a traction control operation to be executed in the braking apparatus of the fourth embodiment.
Figure 11:
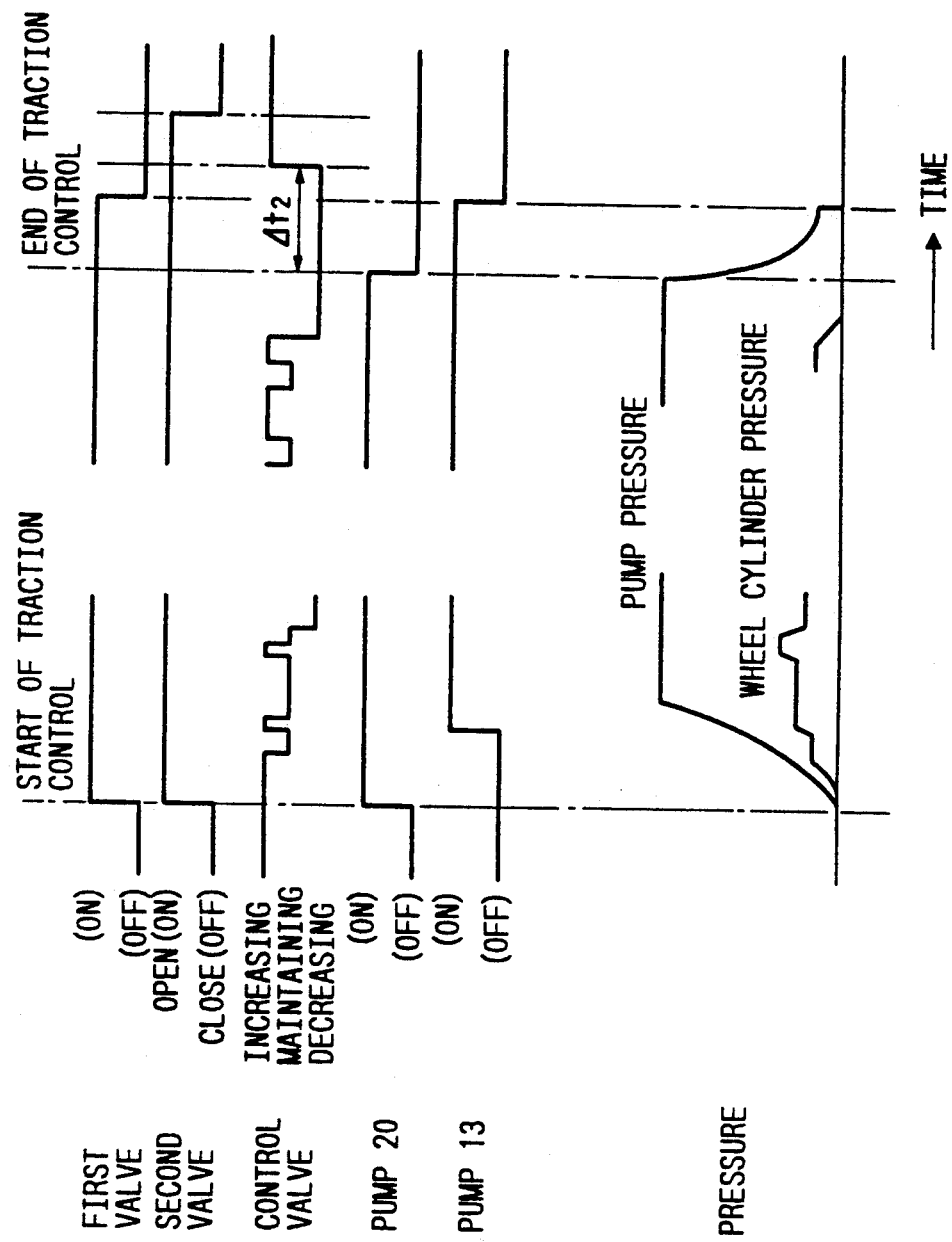
FIG. 11 is a timing chart useful for describing the traction control operation in the fourth embodiment.

Furthermore, a description will be made hereinbelow with reference to FIGS. 9 to 11 in terms of a fourth embodiment of this invention. FIG. 9 shows the entire arrangement of a braking apparatus according to the fourth embodiment of this invention where parts corresponding to those in FIG. 1 are marked with the same numerals and the control system including the ECU is omitted because of being similar to that of the first embodiment. As compared with the first embodiment, one feature of this fourth embodiment is that the second change-over valve 24 is not provided in the braking apparatus and the switching operation between the master cylinder 3, pump 20 and the wheel cylinders 10, 11 is effected by means of a 3-port and 2-position change-over valve 25 as well as in the second embodiment. Here, it is appropriate to use, for the 3-port and 2-position change-over valve 25, a combination of a 2-port and 2-position change-over valve (23) and a check valve (22). According to the fourth embodiment, because of no provision of the second change-over valve 24, it is possible to more and more achieve the size-reduction of the braking apparatus. For realizing the elimination of the second change-over valve 24, the traction control is executed as shown FIG. 10. In FIG. 10, parts (steps) corresponding to those in FIG. 5 are marked with the same numerals and the description thereof will be omitted for brevity. In the fourth embodiment, a step 1000 is provided between the steps 202 and the step 203. As shown in FIG. 11, in the step 1000 the pump 13 is started after a predetermined time period is elapsed from the start of the pump 20 in the step 202. That is, during the traction control operation, the braking liquid discharged to the reservoir 12 is returned by the pump 13 without using the second change-over valve 24. This arrangement allows the elimination of the second change-over valve 24. In addition, a step 2000 is executed between the steps 205 and 206. As shown in FIG. 10, in the step 2000 the pump 13 is stopped after a predetermined time period is elapsed from the stopping of the pump 20 in the step 205. At this time, in a step 207' the control switching valves 6 and 7 are kept to the pressure-decreasing modes for the time period of $\Delta t2$ from the stopping of the pump 20 in the step 205. That is, since the drive of the pump 13 is lengthened after the stopping of the pump 20, most of the braking liquid discharged by the pump 20 can be returned to the master cylinder 3 side by means of the pump 13.

Figure 12:
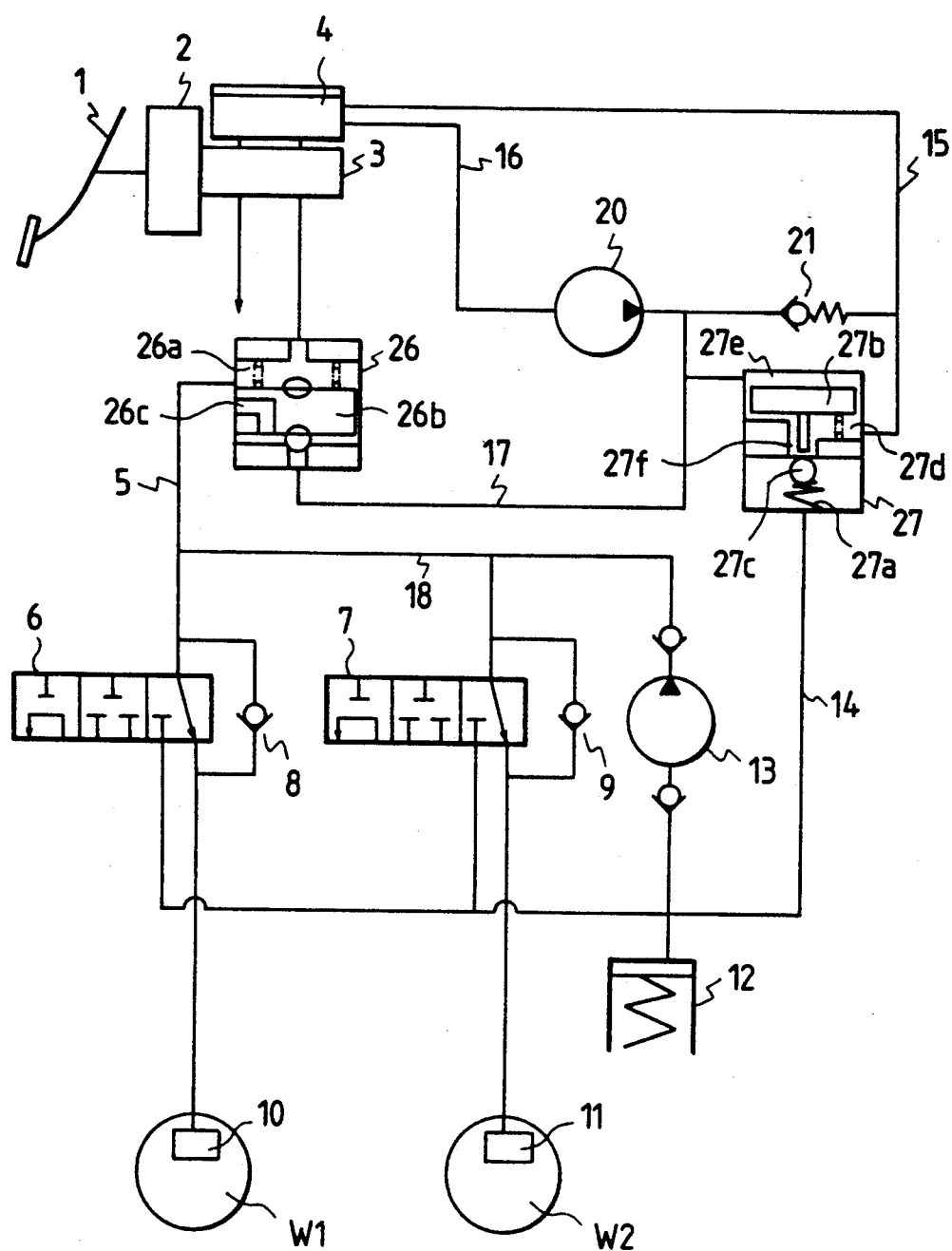
FIG. 12 illustrates an arrangement of a braking apparatus according to a fifth embodiment of this invention.

Furthermore, a description will be made hereinbelow with reference to FIG. 12 in terms of a braking apparatus according to a fifth embodiment of this invention. One feature of the fifth embodiment is that, although in the first embodiment the first and second change-over valves 23 and 24 are of the solenoid-operated type that is operable in response to drive signals from the ECU 40, in place of the change-over valves 23 and 24 first and second charge-over valves 26 and 27 are provided which are of the types that are mechanically operable in accordance with the discharge pressure of the pump 20. As illustrated in FIG. 12, the change-over valve 26 comprises a sliding portion 26b provided in the inside of the valve body so as to be slidable and a spring member 26a for biasing the sliding portion 26b toward the pipe 17 connected to the discharge side of the pump 20. Thus, in the normal state, the first change-over valve 26 establishes the communication between the master cylinder 3 and the wheel cylinders 10 and 11 and cuts the communication between the discharge side of the pump 20 and the master cylinder 10 and 11. Further, the second change-over valve 27 comprises a ball valve 27c, a first spring member 27a for biasing the ball valve 27c in the direction that the ball valve 27c closes a passage 27f formed within the valve body to be coupled to the pipe 14 extending to the reservoir 12, a sliding portion 27b provided within the valve body to be slidable in accordance with the discharge pressure of the pump 20, a pressure chamber 27e formed by the sliding portion 27b so as to be responsive to the discharge pressure from the pump 20, and a second spring member 27d for biasing the sliding portion 27b toward the pressure chamber 27e. In The case of no generation of the discharge pressure of the pump 20, the ball valve 27c closes the passage to cut the communication between the reservoir tank 4 and the reservoir 12.

In response to the drive of the pump 20 effected at the time of the start of the traction control, the discharge pressure of the pump 20 is applied to the first and second change-over valves 26 and 27. At this time, in the first change-over valve 26 the discharge pressure of the pump 20 acts as a force that the sliding portion 26a is moved against the biasing force of the spring member 26a. Thus, the sliding portion 26b is slidden toward the spring member 26a so as to cut the communication between the master cylinder 3 and the wheel cylinders 10, 11 and establish the communication between the discharge side of the pump 20 and the wheel cylinders 10, 11 through a communication hole 26c formed in the sliding portion 26b. On the other hand, in the second change-over valve 27, the discharge pressure of the pump 20 is applied to the pressure chamber 27e so that the sliding portion 27b slides toward the ball valve 27c. Here, the sliding portion 27b is equipped with a projection extending toward the ball valve 27c. Thus, when the sliding portion 27b moves toward the ball valve 27c, the projection thereof comes into contact with the ball valve 27c to open the passage 27f to thereby establish the communication between the reservoir tank 4 and the reservoir 12. Here, the biasing force of the spring member 26a to the sliding member 26b in the first change-over valve 26 is set to be smaller than the resultant force of the biasing forces of the first and second spring members 27a, 27d in the second change-over valve 27. That is, the first change-over valve 26 can be arranged to be quickly responsive to the discharge pressure of the pump 20 so as to establish the communication between the discharge side of the pump 20 and the wheel cylinders 10, 11.

In the fifth embodiment, for a predetermined time period from the time of the stop of the pump 20 due to the completion of the traction control operation, the control switching valves 6 and 7 are set to the pressure-decreasing modes and the pump 13 is driven, whereby the braking liquid discharged from the pump 20 can be returned to the master cylinder 3 side. According to the fifth embodiment, since the mechanically operated type change-over valves 26 and 27 are used in place of the solenoid-operated type change-over valves, it is possible to simplify the hydraulic pressure system. In addition, since drive circuits for the change-over valves 26 and 27 is not required, it is also possible to simplify the control system.

According to the above-described embodiments, it is possible to omit the accumulator and the pressure switch from the braking pressure supply source, thereby allowing the size-reduction of the apparatus and the simplification of the structure of the apparatus. The elimination of the accumulator can also prevent the introduction of gas into the braking hydraulic pressure passages. In addition, even if the pump breaks down, it is possible to keep the slip preventing function at the time of the wheel braking operation. Moreover, when the driving slip occurs, the braking pressure to be supplied to the wheel cylinder to generate a braking force to the wheel is arranged to be gradually increased, thereby reducing the generation of the operating sound.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A braking apparatus for a motor vehicle which is equipped with a master cylinder for generating a pressure in accordance with an operation of a braking pedal and a wheel cylinder for applying a braking force to a wheel in response to a braking pressure applied, said apparatus comprising:

a reservoir tank for storing a braking liquid;
   a pump coupled to said reservoir tank and driven so as to extract braking liquid from said reservoir tank and pressurize and discharge the extracted braking liquid when a slip of said wheel occurs at the time of driving said wheel;
   a pressure adjusting valve provided in a pipe coupling a discharge side of said pump to said reservoir tank and arranged to be openable toward said reservoir tank so that a discharge pressure of said pump is restricted to a predetermined pressure necessary to suppress said slip occurring at the time of driving said wheel;
   an escape valve disposed parallel to said pressure adjusting valve and arranged so as to restrict said discharge pressure of said pump to a pressure higher than said predetermined pressure due to the restriction by said pressure adjusting valve;
   valve means for establishing a communication between said discharge side of said pump and said wheel cylinder when said slip of said wheel occurs at the time of driving said wheel, and for establishing a communication between said master cylinder and said wheel cylinder when the slip does not occur; and
   braking pressure adjusting means provided between said valve means and said wheel cylinder for adjusting said braking pressure to be applied from said pump to said wheel cylinder when said slip of said wheel occurs at the time of driving said wheel.

2. A braking apparatus for a motor vehicle which is equipped with a master cylinder for generating a pressure in accordance with an operation of a braking pedal and a wheel cylinder for applying a braking force to a wheel in response to a braking pressure applied and which is arranged so as to prevent a braking slip or drive slip of said wheel to be generated when said wheel is braked or driven, said apparatus comprising:

a first reservoir for storing a braking liquid;
   a first pump coupled to said first reservoir and driven so as to extract braking liquid from said first reservoir and pressurize and discharge the extracted braking liquid when the drive slip of said wheel occurs;
   a pressure adjusting valve provided in a pipe coupling a discharge side of said first pump to said first reservoir and arranged to be openable toward said first reservoir in order to restrict a discharge pressure of said first pump to a predetermined pressure necessary to suppress the drive slip;
   an escape valve disposed parallel to said pressure adjusting valve and arranged to restrict said discharge pressure of said pump to a pressure higher than said predetermined pressure due to the restriction by said pressure adjusting valve;
   valve means for establishing a communication between said discharge side of said first pump and said wheel cylinder when the drive slip of said wheel occurs, and for establishing a communication between said master cylinder and said wheel cylinder when the drive slip does not occur; and
   braking pressure adjusting means provided between said valve means and said wheel cylinder for adjusting said braking pressure to be applied from said master cylinder or said first pump to said wheel cylinder when the braking or drive slip of said wheel occurs.

3. An apparatus as claimed in claim 2, wherein said valve means has a sliding portion arranged to slide in response to the discharge pressure of said first pump when said first pump is driven, and when said sliding portion slides, said sliding portion cuts a communication between said master cylinder and said wheel cylinder and establishes a communication between the discharge side of said first pump and said wheel cylinder.

4. An apparatus as claimed in claim 2, wherein said braking pressure adjusting means comprises:

a second reservoir for storing the braking liquid discharged from said wheel cylinder at the time of decreasing the braking pressure;
   a control switching valve disposed between said valve means and said wheel cylinder and arranged to selectively take at least a pressure-increasing position for establishing a communication between said valve means and said wheel cylinder and a pressure-decreasing position for establishing a communication between said wheel cylinder and said second reservoir;
   a second pump coupled to said second reservoir so as to extract braking liquid stored in said second reservoir and pressurize and discharge the extracted braking liquid; and
   a return passage for returning the braking liquid pressurized and discharged by said second pump to a pipe between said valve means and said control switching valve.

5. An apparatus as claimed in claim 4, wherein said first reservoir stores the braking liquid under an atmosphere pressure and said second reservoir stores the braking pressure under a pressure higher than the atmosphere pressure, and said first and second reservoirs are coupled to each other through a passage including a change-over valve for establishing and cutting a communication between said first and second reservoirs, said change-over valve establishing the communication between said first and second reservoirs when the drive slip occurs, and until a predetermined time period is elapsed from a stop of said first pump due to a disappearance of the drive slip, said control switching valve is switched to said pressure-decreasing position and said change-over valve is arranged to keep the communication between said first and second reservoirs.

6. An apparatus as claimed in claim 4, wherein, when the drive slip occurs, said first and second pumps are simultaneously driven, and until a predetermined time period is elapsed from a stop of said first pump due to a disappearance of the drive slip, said control switching valve is switched to said pressure-decreasing position and said second pump is kept to be driven.

7. An apparatus as claimed in claim 4, wherein said first reservoir stores the braking liquid under an atmosphere pressure and said second reservoir stores the braking pressure under a pressure higher than the atmosphere pressure, and said first and second reservoirs are coupled to each other through a passage including a change-over valve for establishing and cutting a communication between said first and second reservoirs, said change-over valve has a sliding portion arranged to slide in response to the discharge pressure of said first pump when said first pump is driven, said first and second reservoirs being communicated with each other when said sliding portion slides.

8. A braking apparatus for a motor vehicle which is equipped with a master cylinder for generating a pressure in accordance with an operation of a braking pedal and a wheel cylinder for applying a braking force to a wheel in response to a braking pressure applied and which is arranged so as to prevent a braking slip and a drive slip of said wheel to be generated when said wheel is braked and driven, said apparatus comprising:

a first reservoir for storing a braking liquid;

a first pump coupled to said first reservoir and driven so as to pressurize and discharge said braking liquid from said first reservoir when the drive slip of wheel occurs;

a pressure adjusting valve provided in a pipe coupling a discharge side of said first pump to said first reservoir and arranged to be openable toward said first reservoir so as to restrict a discharge pressure of said first pump to a predetermined pressure necessary to suppress the drive slip;

an escape valve disposed parallel to said pressure-adjusting valve for restricting the discharge pressure of said pump to a pressure higher than the predetermined pressure due to the restriction by said pressure-adjusting valve;

valve means for establishing a communication between said discharge side of said first pump and said wheel cylinder when the drive slip of said wheel occurs so that the braking liquid under pressure due to the restriction by said pressure-adjusting valve is supplied to said wheel cylinder, and for establishing a communication between said master cylinder and said wheel cylinder when the drive slip does not occur;

braking pressure adjusting means provided between said valve means and said wheel cylinder for adjusting said braking pressure to be applied from said master cylinder or said first pump to said wheel cylinder when the braking or drive slip of said wheel occurs; and a check valve provided in a pipe between said valve means and said pressure-adjusting valve for inhibiting flow of the braking liquid from said valve means to said pressure-adjusting valve.

9. A braking apparatus as in claim 8, wherein said valve means has a sliding portion arranged to slide in response to the discharge pressure of said first pump when said first pump is driven, and when said sliding portion slides, said sliding portion cuts a communication between said master cylinder and said wheel cylinder and establishes a communication between said wheel cylinder and the discharge side of said first pump.

10. A braking apparatus as in claim 8, wherein said braking pressure adjusting means comprises:

a second reservoir for storing the braking liquid discharged from said wheel cylinder at the time of decreasing the braking pressure;

a control switching valve disposed between said valve means and said wheel cylinder and arranged to selectively take at least a pressure-increasing position for establishing a communication between said valve means and said wheel cylinder and a pressure-decreasing position for establishing a communication between said wheel cylinder and said second reservoir;

a second pump coupled to said second reservoir for pressurizing and discharging the braking liquid stored in said second reservoir; and a return passage for returning the braking liquid pressurized and discharged by said second pump to a pipe between said valve means and said control switching valve.

11. A braking apparatus as in claim 10, wherein said first reservoir stores the braking liquid under an atmosphere pressure and said second reservoir stores the braking liquid under a pressure higher than the atmosphere pressure, said first and second reservoirs coupled to each other through a passage including a change-over valve for establishing and cutting a communication between said first and second reservoirs, the pipe in which said pressure-adjusting valve is provided being coupled to the passage between said first reservoir and said change-over valve, the pipe in which said escape valve is provided being coupled to the passage between said second reservoir and said change-over valve.

12. A braking apparatus as in claim 10, wherein said first reservoir stores the braking liquid under an atmosphere pressure and said second reservoir stores the braking liquid under a pressure higher than the atmosphere pressure, said first and second reservoirs coupled to each other through a passage including a change-over valve for establishing and cutting a communication between said first and second reservoirs, said change-over valve establishes the communication between said first and second reservoirs when the drive slip occurs, and until a predetermined time period is elapsed from stop of said first pump due to a disappearance of the drive slip, said control switching valve is switched to the pressure-decreasing position and said change-over valve keeps the communication between said first and second reservoirs.

13. A braking apparatus as in claim 10, wherein when the drive slip occurs, said first and second pumps are simultaneously driven, and until a predetermined time period is elapsed from a stop of said first pump due to a disappearance of said drive slip, said control switching valve is switched to the pressure-decreasing position and said second pump is kept to be driven.

* * * * *